June 5, 1951 — O. E. HINTZ, JR — 2,555,542
CENTRIFUGALLY EXPANSIBLE VALVE RING
Filed Jan. 11, 1947
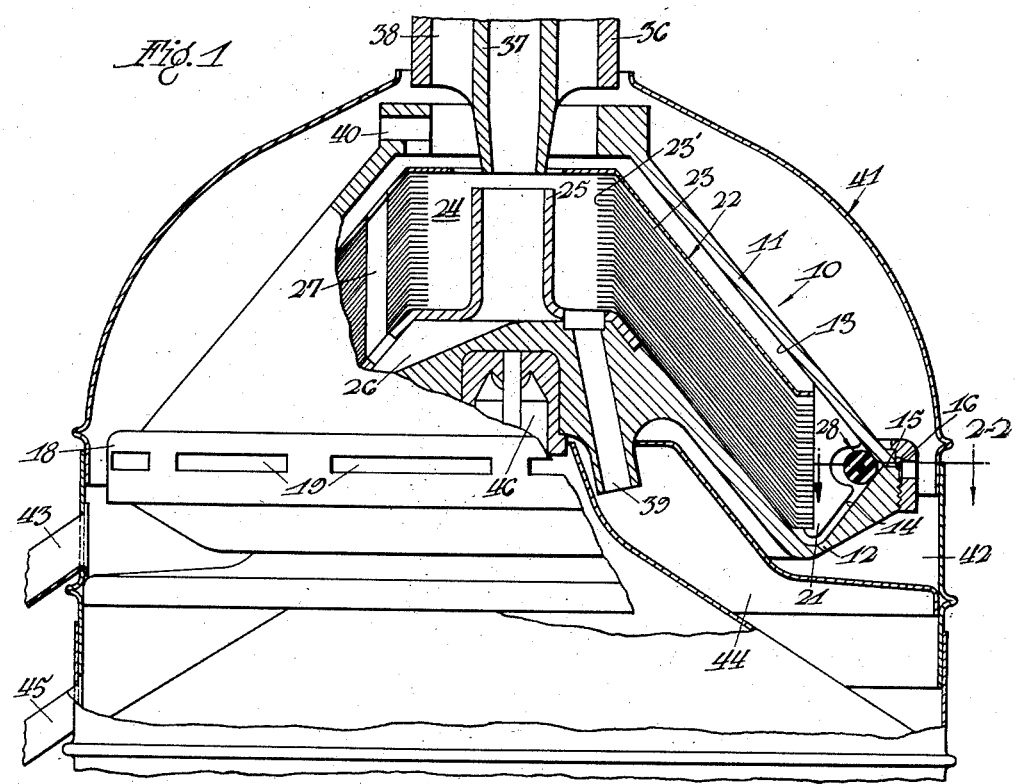
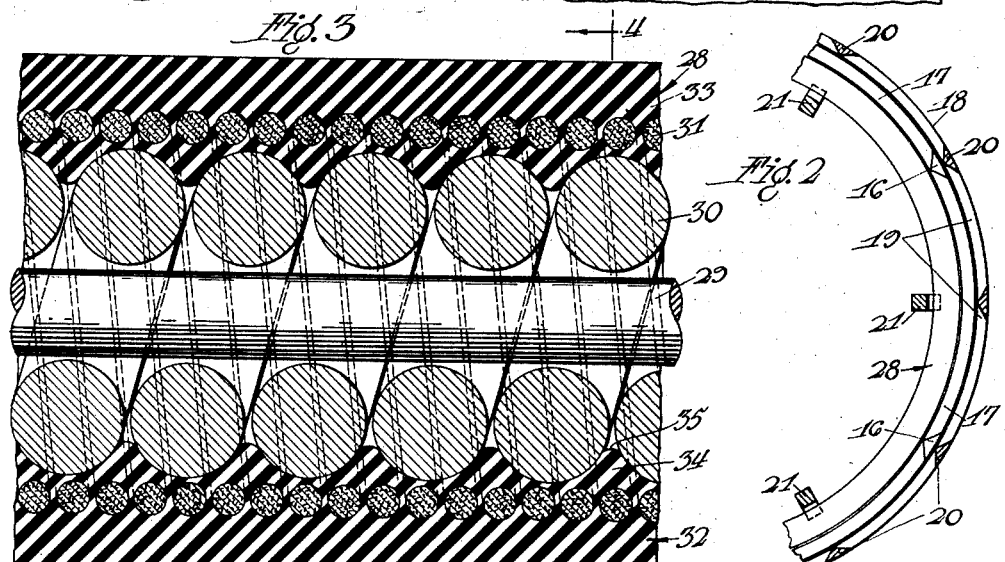
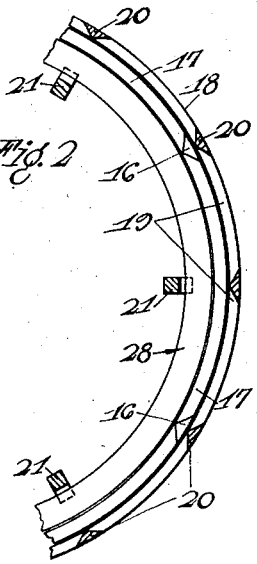
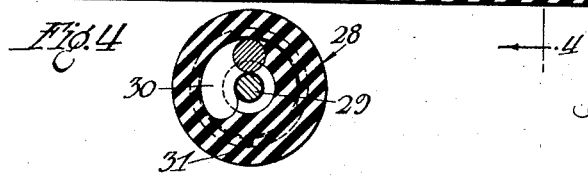
Inventor
Otto E. Hintz, Jr.
By Paul O. Pippel
Atty.

Patented June 5, 1951

2,555,542

UNITED STATES PATENT OFFICE 2,555,542

CENTRIFUGALLY EXPANSIBLE VALVE RING

Otto E. Hintz, Jr., Chicago, Ill., assignor to International Harvester Company, a corporation of New Jersey Application January 11, 1947, Serial No. 721,494

5 Claims. (Cl. 137—140)

This invention relates to an expansible sealing element, and particularly to an annular valve element for sealing an annular opening provided between two conical members spaced apart at their adjacent edges.

More specifically, it relates to an improved expansible valve ring for sealing the annular peripheral discharge opening of a self-washing centrifugal separating bowl of the type disclosed in the William H. Harstick Patent 2,473,948, patented June 21, 1949, for a Speed Controlled Centrifugal Valve.

It is the prime object of this invention to provide an improved construction in a centrifugally expansible valve ring.

It is another object of this invention to provide an improved construction in a resilient centrifugally operable valve ring adapted to seal a substantially continuous annular discharge opening of a centrifugal separating bowl.

It is another object to provide a centrifugally expansible valve ring having a coil spring embedded in a covering of rubber-like material, said covering also including a flexible reinforcing element.

It is still another object to provide a centrifugally expansible valve ring, said ring comprising a coil spring embedded in a covering of rubber-like material and having a reinforcing means within said material for securely retaining the same around said spring despite unusual centrifugal forces developed during high speed axial rotation of said ring.

It is still another object to provide a centrifugally expansible valve ring including an annular coil spring embedded in a covering of rubber-like material, said ring including a resilient cord which is spirally wound around said spring, concentric therewith and embedded within said cover, said cord serving as a reinforcing element to maintain the shape of the covering during the high centrifugal forces resulting from high speed axial rotation of the structure.

It is another object to provide a centrifugally expansible valve element for sealing the annular peripheral discharge opening of a separating bowl, said valve element consisting of a coil spring embedded within a covering of rubber-like material, said rubber-like material including a spirally wound cord which is effective to bind and maintain said covering of rubber-like material around the coil spring despite the high centrifugal forces to which the element may be subjected.

It is still another object to provide a centrifugally expansible valve element for sealing the annular discharge opening provided in the periphery of a cream separating bowl, said element including a reinforcing element which is effective to reinforce the rubber-like material so that the same will be protected from disintegration and premature wearing which might result due to the high centrifugal forces to which the structure may be subjected.

Other objects will become more apparent upon the reading of the annexed specification when examined in conjunction with the drawing in which:

Fig. 1 is a side elevational view of a centrifugal cream separating bowl having portions broken away to disclose pertinent parts of the invention;

Fig. 2 is a sectional view taken along the line 2—2 of Fig. 1, certain parts of the separating bowl and its structure being omitted for the purpose of clarity;

Fig. 3 is an enlarged longitudinal sectional view through a portion of an expansible valve element; and Fig. 4 is a reduced sectional view taken along the line 4—4 of Fig. 3.

A cream separating bowl is generally designated by the reference character 10. The cream separating bowl includes an upper conical casing member 11 and a lower conical casing member 12. The upper and lower conical casing members 11 and 12 are respectively provided with inner sloping surfaces 13 and 14. The sloping surfaces converge at a maximum internal periphery, at which point the adjacent edges of the upper and lower conical casing members are spaced apart as indicated by the reference character 15. The casing members 11 and 12 are held in spaced relation by means of circumferentially positioned diverging projections or spacer members 16. The number of spacers 16 employed may vary depending upon the size and construction of the bowl, it being most desirable to have relatively few so that a substantially free and continuous annular discharge opening 17 is provided.

The upper and lower casing members 11 and 12 are retained in assembly by means of a threaded retaining ring 18. The retaining ring 18 is provided with an annular discharge opening 19 and includes a plurality of connecting portions or spacer elements 20. The spacer elements 20, like the spacer members 16 are diverging in shape in order to provide a substantially continuous unrestricted opening through which washing fluid may be readily discharged.

The upper casing member 11 is provided with a plurality of downwardly extending wings 21. The wings 21 are provided to support a disk pack generally indicated by the reference character 22. The disk pack 22 includes a plurality of frustro-conical separating disks 23 which are mounted within the separating bowl 10 in superposed relation. Each separating disk 23 is provided with a central opening 23', the openings of said disks being in alinement with one another and combinedly serving to form a cylindrical space 24. Centrally positioned within this cylindrical space 24 and seated upon the lower casing member 12 is a milk inlet tube 25. The milk inlet tube 25 is in communication with a plurality of distributor chambers 26, only one of which is shown. The distributor chambers 26 are in turn in communication with a plurality of passages 27, only one of which is shown, formed by eccentrically positioned openings in the separating disks.

A centrifugally expansible valve ring or valve element 28 is positioned adjacent the substantially continuous discharge openings 16 and 19. The valve element 28 functions to regulate the discharge of washing fluid through the openings 17 and 19 as will presently be described. The valve element 28 comprises a resilient expander ring 29 which functions to retain the valve element in a partially expanded position. This expander ring is the subject of applicant's Patent 2,477,982, patented September 28, 1946, for a Speed Controlled Centrifugal Valve, in which the operation of the same is fully disclosed and described. An annular coil spring 30 is coextensive and concentric with respect to said expander ring 29. The internal diameter of the coils of said coil spring are of slightly larger diameter than the diameter of the expander ring 29 for the purpose of permitting free respective movement between said members. A reinforcing element or cord 31 is spirally wound around the coil spring and is concentric and coextensive therewith. The cord 31 may be of any suitable flexible material, such as rayon, cotton cord, or other durable flexible material. A covering of rubber-like material 32 generally surrounds the complete structure enclosing the cord 31, coil spring 30, and expander ring 29. The covering 32 consists of an outer layer of substantial thickness of material generally designated by the reference character 33. The covering 32 also includes an inner layer of material 34 of lesser thickness. The inner layer 34 is provided with a plurality of projections or rib portions 35 which engage outer edges of the coils of the coil spring 30. The cord 31 is completely embedded within the covering 32, the inner layer 34 separating said cord from the outer edges of the coil spring 30.

A supply nozzle 36 is positioned above and extends into the separating bowl 10. The supply nozzle 36 includes a milk feed tube 37 in axial alinement with the milk inlet tube 25. A washing liquid supply tube 38 is also integrally formed with the nozzle 36. The cylindrical space 24 is directly in communication with a downwardly extending cream outlet 39 in the lower casing member 12 and a conventional type of skim milk outlet 40 provided in the upper casing member 11.

A tinware construction surrounds the separating bowl 10 and is generally designated by the reference character 41. The tinware is partitioned off to provide a skim milk chamber 42 which is in communication with a skim milk spout 43. A cream receiving chamber 44 is in communication with the cream outlet 39 and a cream spout 45.

The cream separating bowl 10 is suitably driven by means of an electric motor or power device, not shown, which is in operative communication with a driving shaft 46 suitably keyed to the lower casing member 12 for rotating the cream separating bowl 10.

During the operation of the cream separating bowl 10, the centrifugal force created by the rotation of said bowl is sufficient to centrifugally expand the expansible valve element 28 radially outwardly, thereby sealing the substantially continuous discharge openings 16 and 9. When the separating operation has been completed and it is desired to wash the cream separating bowl and free the same of remaining portions of milk or slime, the washing water is introduced to the milk feed tube 37 and the washing liquid supply tube, thereby filling up the cylindrical space 24 and distributor chamber 26 with washing liquid. The speed of rotation of the bowl 10 is thereupon lowered, whereby the centrifugally expansible valve ring 28 will contract due to the action of the coil spring 30 and the washing liquid will be free to escape through the discharge openings 16 and 19, thereby completely washing the interior parts of the separating bowl.

It can be seen from the above mentioned operation that the centrifugally expansible valve ring 28 is subjected to continuous action and unusual centrifugal forces. This requires, therefore, that the ring be of sturdy construction so as to withstand tearing and premature wear occasioned by the extreme centrifugal forces to which it is subjected. In previous rings great difficulty was experienced in that the valve rings would, under high centrifugal force, disintegrate and portions of the rubber-like material would become wedged in between and fly through the discharge openings 16 and 19. This in some instances was also attributed to imperfect bonding between the rubber covering and the coil spring 30. In previous constructions, however, it was both difficult and impractical to determine whether or not a sufficient bond between the rubber-like material and the coil spring was effected and the operator had to rely largely on trial-and-error to determine whether or not a good bond was obtained. In applicant's construction it is immaterial whether or not the rubber-like covering is adequately bonded to the spring 30. The flexible element or cord which is spirally wound or embedded within the rubber covering 32 is sufficient to provide an adequate reinforcing means which will restrain and retain said covering around the coil springs despite the most unusual wear and centrifusal forces to which it may be subjected. The adjacent coils of the cord 31 are spaced apart, as can best be seen in Fig. 3, and these spaces necessarily of course increase as the valve element is expanded due to centrifugal forces. It can readily be seen, therefore, that even though the cord acts as a positive reinforcing element for the rubber covering, it at the same time is sufficiently flexible to permit free expansion of the ring during the operation of the same. By virtue of the reinforcing element or cord therefor, a centrifugally expansible valve ring is provided which will stand up under most unusual kind of usage and is of such durable nature that it can be utilized over greater periods of time than afforded by previous constructions.

The objects of the invention therefore have been clearly achieved by applicant's novel construction. It is to be understood that modifications and changes in this construction may be made which do not depart from the spirit of the invention as disclosed nor the scope thereof as defined in the appended claims.

What is claimed is:

1. A centrifugally operable valve ring adapted to be supported adjacent to a discharge opening, comprising an annular coil spring, a reinforcing cord wound around said coil spring, said cord being concentric and coextensive with said spring, means positioned between the cord and the coil spring to maintain said cord in laterally spaced relation with respect to said spring, and an annular cover of rubber-like material enclosing said cord and said spring, said valve ring being adapted to expand in response to centrifugal force and adapted to regulate the discharge of liquids through a discharge opening.

2. An expansible valve adapted to be supported adjacent to a discharge opening for controlling the flow of liquids through the opening comprising an annular expansible spring, an annular rubber covering enclosing said spring, said covering extending throughout the length of said spring, and a reinforcing cord enclosed within and spirally wound throughout said covering, said spring and covering being expansible by centrifugal force and adapted to engage and seal a discharge opening.

3. An expansible valve ring adapted to be supported adjacent to a discharge opening for controlling the flow of liquid through the opening, comprising an annular coil spring, an annular rubber covering enclosing said spring, said covering extending throughout the length of the spring and including portions extending inwardly between the coils of said coil spring, and a reinforcing cord embedded within said rubber covering, said covering and said spring being expansible by centrifugal force and adapted to engage a discharge opening for regulating the flow of liquids through the opening.

4. An expansible valve ring adapted to be supported adjacent to a discharge opening comprising an annular coil spring, an annular rubber-like covering for said spring, said covering extending throughout the length of said spring and including an inner peripheral surface enclosing the spring, said covering including an annular outer peripheral surface, and a flexible reinforcing element embedded in the covering between the inner and outer peripheral surfaces, said valve ring being expansible by centrifugal force and adapted to engage a discharge opening for regulating the flow of liquid through the opening.

5. An expansible valve ring adapted to be supported adjacent to a discharge opening comprising an annular coil spring, an annular covering of expansible material extending throughout the length of said spring, said covering having an inner peripheral surface surrounding and enclosing the spring, said covering including an outer peripheral sealing surface, and a flexible reinforcing cord embedded within the covering between the outer and inner surfaces, said cord being spirally wound about the spring, said valve ring being adapted to expand in response to centrifugal force and adapted to engage and seal a discharge opening.

OTTO E. HINTZ, Jr.

REFERENCES CITED

The following references are of record in the file of this patent:

UNITED STATES PATENTS

| Number | Name | Date |
|---|---|---|
| 911,822 | Knox | Feb. 9, 1909 |
| 1,854,708 | Mastin et al. | Apr. 19, 1932 |
| 1,878,885 | Pahl | Sept. 20, 1932 |
| 2,008,682 | Christenson | July 23, 1935 |
| 2,477,983 | Hintz | Aug. 2, 1949 |

FOREIGN PATENTS

| Number | Country | Date |
|---|---|---|
| 475,967 | Great Britain | of 1937 |